(12) United States Patent
    Molnar

(10) Patent No.: US 9,370,455 B2
(45) Date of Patent: Jun. 21, 2016

(54) WHEELCHAIR SUSPENSION

(71) Applicant: Invacare Corporation, Elyria, OH (US)

(72) Inventor: James H. Molnar, Bedford, OH (US)

(73) Assignee: INVACARE CORPORATION, Elyria, OH (US)

( * ) Notice: Subject to any disclaimer, the term of this patent is extended or adjusted under 35 U.S.C. 154(b) by 0 days.

(21) Appl. No.: 14/585,393

(22) Filed: Dec. 30, 2014

(65) Prior Publication Data

US 2015/0108735 A1    Apr. 23, 2015

Related U.S. Application Data

(63) Continuation of application No. 13/465,268, filed on May 7, 2012, now Pat. No. 8,925,943, which is a continuation of application No. 12/330,554, filed on Dec. 9, 2008, now Pat. No. 8,172,015, which is a continuation of application No. 11/429,687, filed on May 8, 2006, now Pat. No. 7,472,767, which is a continuation of application No. 10/762,977, filed on Jan. 22, 2004, now Pat. No. 7,055,634, which is a continuation of application No. 09/974,348, filed on Oct. 10, 2001, now Pat. No. 7,040,429.

(51) Int. Cl.
    *A61G 5/06*     (2006.01)
    *A61G 5/10*     (2006.01)
    *A61G 5/04*     (2013.01)
    *B60G 5/01*     (2006.01)

(52) U.S. Cl.
    CPC *A61G 5/10* (2013.01); *A61G 5/043* (2013.01); *A61G 5/06* (2013.01); *B60G 5/01* (2013.01); *A61G 2005/1078* (2013.01); *A61G 2203/14* (2013.01); *B60G 2300/24* (2013.01); *Y10S 180/907* (2013.01); *Y10S 297/04* (2013.01)

(58) Field of Classification Search
    CPC .......... A61G 5/10; A61G 5/043; A61G 5/06; A61G 2005/1078; A61G 2203/14; B60G 5/01; B60G 2300/24; Y10S 297/04; Y10S 180/907
    See application file for complete search history.

(56) References Cited

U.S. PATENT DOCUMENTS 865,514 A * 9/1907 Mullenmeister ........ B62B 1/002
                                                        280/10
1,116,086 A   11/1914 Lewis
(Continued)

FOREIGN PATENT DOCUMENTS

CA        2254372      5/2000
DE         152186      9/1903
(Continued)

OTHER PUBLICATIONS

Notice of Allowance from U.S. Appl. No. 12/330,554 dated Feb. 14, 2012.
(Continued)

*Primary Examiner* — Paul N Dickson
*Assistant Examiner* — Timothy Wilhelm

(57) ABSTRACT

A wheelchair suspension includes a frame, a pivoting assembly, at least one front caster, and at least one rear caster. The pivoting assembly has a first link pivotally coupled to the frame member, a second link pivotally coupled to the frame member, a drive assembly fixedly connected to a first end of the first link, and a third link pivotally connected to the first link and pivotally connected to the second link. The drive assembly causes downward pivotal movement of the first end of the first link and upward pivotal movement of a second end of the first link. The upward pivotal movement of the second end of the first link causes the second link and the caster assembly to undergo upward movement.

2 Claims, 6 Drawing Sheets

(56) References Cited

U.S. PATENT DOCUMENTS

| | | |
|---|---|---|
| 1,151,414 A | 8/1915 | Steinbach |
| 1,773,254 A | 9/1930 | Becker |
| 1,973,627 A | 9/1934 | Harter |
| 2,398,211 A | 4/1946 | du Pont |
| 2,427,482 A | 9/1947 | Wiessman |
| 2,767,995 A | 10/1956 | Stout |
| 2,949,153 A | 8/1960 | Hickman |
| 2,986,200 A | 5/1961 | Nobile |
| 3,104,112 A | 9/1963 | Crail |
| 3,174,176 A | 3/1965 | Olson |
| 3,191,990 A | 6/1965 | Rugg et al. |
| 3,195,670 A | 7/1965 | Dunn |
| 3,210,092 A | 10/1965 | Kraus et al. |
| 3,282,605 A | 11/1966 | Nihlean et al. |
| 3,314,672 A | 4/1967 | Persson |
| 3,506,079 A | 4/1970 | Madler et al. |
| 3,573,877 A | 4/1971 | Locke |
| 3,580,591 A | 5/1971 | Coffey |
| 3,589,700 A | 6/1971 | Ruet et al. |
| 3,592,282 A | 7/1971 | Soileau |
| 3,602,522 A | 8/1971 | Zamotin |
| 3,618,968 A | 11/1971 | Greer |
| 3,627,157 A | 12/1971 | Blatchly |
| 3,661,228 A | 5/1972 | Glasser |
| 3,664,450 A | 5/1972 | Udden et al. |
| 3,682,462 A | 8/1972 | Papousek |
| 3,689,103 A | 9/1972 | Meulendyk |
| 3,709,313 A | 1/1973 | James |
| 3,848,883 A | 11/1974 | Breacain |
| 3,862,751 A | 1/1975 | Schwaller |
| 3,876,012 A | 4/1975 | Regier |
| 3,881,773 A | 5/1975 | Rodaway |
| 3,883,153 A | 5/1975 | Singh et al. |
| 3,893,529 A | 7/1975 | Karchak, Jr. et al. |
| 3,901,337 A | 8/1975 | Cragg |
| 3,901,527 A | 8/1975 | Danziger et al. |
| 3,905,437 A | 9/1975 | Kaiho et al. |
| 3,917,312 A | 11/1975 | Rodaway |
| 3,930,551 A | 1/1976 | Cragg |
| 3,952,822 A | 4/1976 | Udden et al. |
| 3,953,054 A | 4/1976 | Udden et al. |
| 3,976,152 A | 8/1976 | Bell |
| 4,078,817 A | 3/1978 | Ferguson et al. |
| 4,108,449 A | 8/1978 | Rhodes |
| 4,118,020 A | 10/1978 | Myers |
| 4,119,163 A | 10/1978 | Ball |
| 4,128,137 A | 12/1978 | Booth |
| 4,190,263 A | 2/1980 | Powers |
| 4,222,449 A | 9/1980 | Feliz |
| 4,245,847 A | 1/1981 | Knott |
| 4,247,125 A | 1/1981 | Rayment |
| 4,264,085 A | 4/1981 | Volin |
| 4,310,167 A | 1/1982 | McLaurin |
| 4,333,681 A | 6/1982 | Nelson |
| 4,337,958 A | 7/1982 | Witt et al. |
| 4,341,278 A | 7/1982 | Meyer |
| 4,375,295 A | 3/1983 | Volin |
| 4,387,325 A | 6/1983 | Klimo |
| 4,405,142 A | 9/1983 | Whetstine |
| 4,436,320 A | 3/1984 | Brudermann et al. |
| 4,437,678 A | 3/1984 | Schultz |
| 4,455,029 A | 6/1984 | Taylor |
| 4,455,031 A | 6/1984 | Hosaka |
| 4,456,295 A | 6/1984 | Francu |
| 4,483,407 A | 11/1984 | Iwamoto et al. |
| 4,500,102 A | 2/1985 | Haury et al. |
| 4,513,832 A | 4/1985 | Engman |
| 4,515,385 A | 5/1985 | Christian |
| 4,542,918 A | 9/1985 | Singleton |
| 4,545,593 A | 10/1985 | Farnam |
| 4,545,616 A | 10/1985 | Booth |
| 4,556,229 A | 12/1985 | Bihler et al. |
| 4,565,385 A | 1/1986 | Morford |
| 4,592,570 A | 6/1986 | Nassiri |
| RE32,242 E | 9/1986 | Minnebraker |
| 4,618,155 A | 10/1986 | Jayne |
| 4,641,848 A | 2/1987 | Ayers |
| 4,655,471 A | 4/1987 | Peek |
| 4,687,068 A | 8/1987 | Pagett |
| 4,720,223 A | 1/1988 | Neights et al. |
| 4,721,321 A | 1/1988 | Haury et al. |
| 4,721,322 A | 1/1988 | Hawkins |
| 4,730,842 A | 3/1988 | Summers et al. |
| 4,736,983 A | 4/1988 | Furbee |
| 4,759,418 A | 7/1988 | Goldenfeld et al. |
| 4,763,910 A | 8/1988 | Brandli et al. |
| 4,805,712 A | 2/1989 | Singleton |
| 4,805,925 A | 2/1989 | Haury et al. |
| 4,811,966 A | 3/1989 | Singleton |
| 4,823,900 A | 4/1989 | Farnam |
| 4,826,194 A | 5/1989 | Sakita |
| 4,840,394 A * | 6/1989 | Bickler .................. B60G 5/01 280/677 |
| 4,861,056 A | 8/1989 | Duffy, Jr. et al. |
| 4,862,983 A | 9/1989 | Kreft |
| 4,886,294 A | 12/1989 | Nahachewski |
| 4,905,972 A | 3/1990 | Scowen |
| 4,919,441 A | 4/1990 | Marier et al. |
| 4,926,952 A | 5/1990 | Farnam |
| 4,934,626 A | 6/1990 | Kimura |
| 4,951,766 A | 8/1990 | Basedow et al. |
| 4,962,942 A | 10/1990 | Barnett et al. |
| 4,967,864 A | 11/1990 | Boyer et al. |
| 4,989,890 A | 2/1991 | Lockard et al. |
| 5,020,816 A | 6/1991 | Mulholland |
| 5,042,607 A | 8/1991 | Falkenson et al. |
| 5,044,647 A | 9/1991 | Patterson |
| 5,044,648 A | 9/1991 | Knapp |
| 5,076,390 A | 12/1991 | Haskins |
| 5,076,602 A | 12/1991 | Robertson et al. |
| 5,113,959 A | 5/1992 | Mastov et al. |
| 5,123,495 A | 6/1992 | Littlejohn et al. |
| 5,125,468 A | 6/1992 | Coker |
| 5,137,295 A | 8/1992 | Peek |
| 5,156,226 A | 10/1992 | Boyer et al. |
| 5,176,393 A | 1/1993 | Robertson et al. |
| 5,180,025 A | 1/1993 | Yeh et al. |
| 5,180,275 A | 1/1993 | Czech et al. |
| 5,181,133 A | 1/1993 | Lipton |
| 5,181,733 A | 1/1993 | Tague |
| 5,183,133 A | 2/1993 | Roy et al. |
| 5,197,559 A | 3/1993 | Garin, III et al. |
| 5,203,610 A | 4/1993 | Miller |
| 5,209,509 A | 5/1993 | Gay et al. |
| 5,222,567 A | 6/1993 | Broadhead et al. |
| 5,228,709 A | 7/1993 | Kao |
| 5,230,522 A | 7/1993 | Gehlsen et al. |
| 5,241,876 A | 9/1993 | Mathis |
| 5,248,007 A | 9/1993 | Watkins et al. |
| 5,290,055 A | 3/1994 | Treat, Jr. |
| 5,294,141 A | 3/1994 | Mentessi et al. |
| 5,297,021 A | 3/1994 | Koerlin et al. |
| 5,301,964 A | 4/1994 | Papac |
| 5,316,328 A | 5/1994 | Bussinger |
| 5,341,533 A | 8/1994 | Seitz |
| 5,351,774 A | 10/1994 | Okamoto |
| 5,366,037 A | 11/1994 | Richey |
| 5,372,211 A | 12/1994 | Wilcox et al. |
| 5,403,031 A | 4/1995 | Gottschalk et al. |
| 5,419,571 A | 5/1995 | Vaughan |
| 5,435,404 A * | 7/1995 | Garin, III ............... A61G 5/043 180/6.5 |
| 5,447,317 A | 9/1995 | Gehlsen et al. |
| 5,464,271 A | 11/1995 | McFarland |
| 5,467,838 A | 11/1995 | Wu |
| 5,482,261 A | 1/1996 | Ortega |
| 5,485,140 A | 1/1996 | Bussin |
| 5,489,139 A | 2/1996 | McFarland |
| 5,513,875 A | 5/1996 | Tahara et al. |
| 5,518,081 A | 5/1996 | Thibodeau |
| 5,531,284 A | 7/1996 | Okamoto |
| 5,540,297 A | 7/1996 | Meier |
| 5,562,172 A | 10/1996 | Mick |
| 5,564,512 A | 10/1996 | Scheulderman |

(56) References Cited

U.S. PATENT DOCUMENTS

| | | | |
|---|---|---|---|
| 5,575,348 A | 11/1996 | Goertzen et al. | |
| 5,611,555 A | 3/1997 | Vidal | |
| 5,628,377 A | 5/1997 | LaGloan | |
| 5,701,122 A | 12/1997 | Canedy | |
| 5,727,802 A | 3/1998 | Garven, Jr. et al. | |
| 5,727,809 A | 3/1998 | Ordelman et al. | |
| 5,762,155 A | 6/1998 | Scheulderman | |
| 5,772,048 A | 6/1998 | Sopcisak | |
| 5,772,226 A | 6/1998 | Bobichon | |
| 5,772,237 A * | 6/1998 | Finch | A61G 5/06 180/65.1 |
| D397,645 S | 9/1998 | Schaffner | |
| 5,833,248 A | 11/1998 | Eguchi | |
| 5,848,658 A | 12/1998 | Pulver | |
| 5,851,018 A | 12/1998 | Curran et al. | |
| 5,851,019 A * | 12/1998 | Gill | A61G 5/10 280/250.1 |
| 5,853,059 A | 12/1998 | Goertzen et al. | |
| D404,693 S | 1/1999 | Schaffner et al. | |
| 5,855,387 A | 1/1999 | Gill et al. | |
| 5,899,475 A | 5/1999 | Verhaeg et al. | |
| 5,904,214 A | 5/1999 | Lin | |
| 5,921,532 A | 7/1999 | Pierce et al. | |
| 5,944,131 A | 8/1999 | Schaffner et al. | |
| 5,954,351 A | 9/1999 | Koschinat | |
| 5,957,474 A | 9/1999 | Mundy et al. | |
| 5,964,473 A | 10/1999 | Degonda et al. | |
| 5,988,304 A | 11/1999 | Behrendts | |
| 5,996,716 A | 12/1999 | Montiglio et al. | |
| 6,003,624 A | 12/1999 | Jorgensen et al. | |
| 6,029,763 A | 2/2000 | Swisher | |
| 6,041,876 A | 3/2000 | Pulver et al. | |
| 6,047,979 A | 4/2000 | Kraft et al. | |
| 6,062,600 A | 5/2000 | Kamen et al. | |
| 6,068,280 A | 5/2000 | Torres | |
| 6,070,898 A * | 6/2000 | Dickie | A61G 5/043 180/65.1 |
| 6,073,951 A | 6/2000 | Jindra et al. | |
| 6,079,698 A | 6/2000 | Patterson et al. | |
| 6,079,725 A | 6/2000 | Lazaros | |
| D429,665 S | 8/2000 | Dickie | |
| 6,095,271 A | 8/2000 | Dickie et al. | |
| 6,129,165 A | 10/2000 | Schaffner et al. | |
| 6,131,679 A | 10/2000 | Pulver et al. | |
| 6,135,222 A | 10/2000 | Furukawa | |
| 6,161,856 A * | 12/2000 | Peterson | A61G 5/1062 280/250.1 |
| 6,168,178 B1 * | 1/2001 | Garven, Jr. | A61G 5/08 280/250.1 |
| 6,176,335 B1 | 1/2001 | Schaffner et al. | |
| 6,179,076 B1 | 1/2001 | Fernie et al. | |
| 6,186,252 B1 | 2/2001 | Schaffner et al. | |
| 6,196,343 B1 | 3/2001 | Strautnieks | |
| 6,199,647 B1 | 3/2001 | Schaffner et al. | |
| 6,206,119 B1 * | 3/2001 | Wu | A61G 5/043 180/24.02 |
| 6,209,670 B1 | 4/2001 | Fernie et al. | |
| 6,217,114 B1 | 4/2001 | Degonda | |
| 6,225,894 B1 | 5/2001 | Kyrtsos | |
| 6,234,263 B1 | 5/2001 | Boivin et al. | |
| 6,234,507 B1 | 5/2001 | Dickie et al. | |
| 6,241,275 B1 | 6/2001 | Slagerman | |
| 6,264,218 B1 | 7/2001 | Slagerman | |
| 6,279,927 B1 * | 8/2001 | Nishihira | A61G 5/043 180/11 |
| 6,312,000 B1 * | 11/2001 | Pauls | A61G 5/043 180/907 |
| 6,322,089 B1 | 11/2001 | Dantele et al. | |
| 6,341,657 B1 * | 1/2002 | Hopely, Jr. | A61G 5/043 180/24.07 |
| 6,341,671 B1 | 1/2002 | Ebersole | |
| 6,347,688 B1 | 2/2002 | Hall et al. | |
| 6,357,793 B1 * | 3/2002 | Dickie | A61G 5/10 16/20 |
| 6,375,209 B1 | 4/2002 | Schlangen | |
| 6,394,738 B1 | 5/2002 | Springer | |
| 6,405,816 B1 | 6/2002 | Kamen et al. | |
| 6,425,597 B1 | 7/2002 | Peterson | |
| 6,428,020 B1 | 8/2002 | Steadman | |
| 6,428,029 B1 | 8/2002 | Barclay | |
| 6,429,541 B2 | 8/2002 | Takenaka et al. | |
| 6,454,286 B1 | 9/2002 | Hosino | |
| 6,460,641 B1 | 10/2002 | Kral | |
| 6,460,869 B1 | 10/2002 | Tremouilles | |
| 6,494,474 B1 | 12/2002 | Kramer, Jr. | |
| 6,533,305 B1 | 3/2003 | Falk | |
| 6,533,306 B2 | 3/2003 | Watkins | |
| 6,543,564 B1 | 4/2003 | Kamen et al. | |
| 6,543,798 B2 | 4/2003 | Schaffner et al. | |
| 6,554,086 B1 | 4/2003 | Goertzen et al. | |
| 6,568,030 B1 | 5/2003 | Watanabe et al. | |
| 6,581,711 B1 | 6/2003 | Tuluie | |
| 6,588,799 B1 | 7/2003 | Sanchez | |
| 6,601,863 B1 | 8/2003 | Mentessi et al. | |
| 6,640,916 B2 | 11/2003 | Schaffner et al. | |
| 6,684,969 B1 | 2/2004 | Flowers et al. | |
| 6,688,437 B2 | 2/2004 | Usherovich | |
| 6,702,306 B1 | 3/2004 | Ockwell | |
| 6,712,369 B2 | 3/2004 | Wu | |
| 6,715,845 B2 | 4/2004 | Kamen et al. | |
| D491,115 S | 6/2004 | Taylor | |
| 6,776,430 B2 * | 8/2004 | White | A61G 5/045 180/907 |
| 6,851,711 B2 | 2/2005 | Goertzen et al. | |
| 6,857,490 B2 | 2/2005 | Quigg | |
| 6,923,278 B2 | 8/2005 | Mulhern et al. | |
| 6,923,280 B2 | 8/2005 | Goertzen et al. | |
| 6,935,448 B2 | 8/2005 | Goertzen et al. | |
| 6,938,923 B2 | 9/2005 | Mulhern et al. | |
| 7,021,641 B2 | 4/2006 | Wu | |
| 7,040,429 B2 | 5/2006 | Molnar et al. | |
| 7,055,634 B2 | 6/2006 | Molnar | |
| 7,066,290 B2 | 6/2006 | Fought | |
| 7,083,195 B2 | 8/2006 | Goertzen et al. | |
| 7,100,716 B2 | 9/2006 | Engels et al. | |
| 7,175,193 B2 | 2/2007 | Wu | |
| 7,219,755 B2 | 5/2007 | Goertzen et al. | |
| 7,219,924 B2 | 5/2007 | Mulhern et al. | |
| 7,232,008 B2 | 6/2007 | Levi et al. | |
| 7,234,554 B2 | 6/2007 | Mulhern et al. | |
| 7,264,272 B2 | 9/2007 | Mulhern et al. | |
| 7,273,118 B2 | 9/2007 | Huang | |
| 7,293,801 B2 | 11/2007 | Bertrand et al. | |
| 7,316,282 B2 | 1/2008 | Mulhern et al. | |
| 7,370,876 B2 | 5/2008 | Hsu et al. | |
| 7,374,002 B2 | 5/2008 | Fought | |
| 7,380,824 B2 | 6/2008 | Chen et al. | |
| 7,389,835 B2 | 6/2008 | Mulhern et al. | |
| 7,398,842 B2 | 7/2008 | Fontecchio et al. | |
| 7,413,038 B2 | 8/2008 | Mulhern et al. | |
| 7,461,897 B2 | 12/2008 | Kruse et al. | |
| 7,472,767 B2 | 1/2009 | Molnar | |
| 7,490,683 B2 | 2/2009 | Schaffner | |
| 7,506,709 B2 | 3/2009 | Kiwak et al. | |
| 7,516,984 B2 * | 4/2009 | Tang | A61G 5/043 180/65.1 |
| 7,556,109 B2 * | 7/2009 | Chen | A61G 5/043 180/65.1 |
| 7,597,163 B2 | 10/2009 | Goertzen et al. | |
| 7,735,591 B2 | 6/2010 | Puskar-Pasewicz et al. | |
| 7,766,106 B2 | 8/2010 | Puskar-Pasewicz et al. | |
| 7,775,307 B2 | 8/2010 | Cheng | |
| 7,828,310 B2 | 11/2010 | Vreeswijk et al. | |
| D632,229 S | 2/2011 | Kruse | |
| 7,882,909 B2 | 2/2011 | Pearlman et al. | |
| 7,896,394 B2 | 3/2011 | Jackson et al. | |
| 8,037,953 B2 | 10/2011 | Puskar-Pasewicz et al. | |
| 8,118,321 B2 | 2/2012 | Hunziker et al. | |
| 8,172,015 B2 | 5/2012 | Molnar | |
| 8,172,016 B2 | 5/2012 | Goertzen et al. | |
| 8,177,257 B2 | 5/2012 | Dugas et al. | |
| 8,186,463 B2 | 5/2012 | Hunziker et al. | |
| 8,210,556 B2 | 7/2012 | Zhou et al. | |

(56) References Cited

U.S. PATENT DOCUMENTS

| | | | |
|---|---|---|---|
| 8,272,461 B2 * | 9/2012 | Bekoscke | A61G 5/043 180/65.1 |
| 8,286,738 B2 | 10/2012 | Cheng | |
| 8,297,388 B2 | 10/2012 | Lindenkamp et al. | |
| 8,573,341 B2 | 11/2013 | Fought et al. | |
| 8,910,975 B2 | 12/2014 | Bekoscke et al. | |
| 9,010,470 B2 | 4/2015 | Cuson et al. | |
| 2001/0011613 A1 | 8/2001 | Schaffner et al. | |
| 2001/0013437 A1 | 8/2001 | Husted et al. | |
| 2002/0023787 A1 | 2/2002 | Kamen et al. | |
| 2002/0088657 A1 | 7/2002 | Brett et al. | |
| 2002/0175027 A1 | 11/2002 | Usherovich | |
| 2003/0030243 A1 | 2/2003 | Engels | |
| 2003/0075365 A1 | 4/2003 | Fought | |
| 2003/0122332 A1 | 7/2003 | Engels et al. | |
| 2003/0168264 A1 | 9/2003 | Goertzen et al. | |
| 2003/0168265 A1 | 9/2003 | Goertzen et al. | |
| 2003/0201632 A1 | 10/2003 | Mulhern et al. | |
| 2003/0205420 A1 | 11/2003 | Mulhern et al. | |
| 2004/0004342 A1 | 1/2004 | Mulhern et al. | |
| 2004/0032119 A1 | 2/2004 | Tran et al. | |
| 2004/0060748 A1 | 4/2004 | Molnar | |
| 2004/0084230 A1 | 5/2004 | Grymko et al. | |
| 2004/0094944 A1 | 5/2004 | Goertzen et al. | |
| 2004/0144580 A1 | 7/2004 | Wu | |
| 2004/0150204 A1 | 8/2004 | Goertzen et al. | |
| 2004/0159476 A1 | 8/2004 | Molnar | |
| 2004/0168839 A1 | 9/2004 | Wu | |
| 2004/0188152 A1 | 9/2004 | Schaffner | |
| 2004/0232683 A1 | 11/2004 | Mulhern | |
| 2004/0262859 A1 | 12/2004 | Turturiello | |
| 2005/0034903 A1 | 2/2005 | Wu | |
| 2005/0077694 A1 | 4/2005 | Levi | |
| 2005/0077714 A1 | 4/2005 | Mulhern et al. | |
| 2005/0077715 A1 | 4/2005 | Mulhern et al. | |
| 2005/0127631 A1 | 6/2005 | Schaffner | |
| 2005/0151360 A1 | 7/2005 | Bertrand et al. | |
| 2005/0206124 A1 | 9/2005 | Levi | |
| 2005/0206149 A1 | 9/2005 | Mulhern et al. | |
| 2005/0225040 A1 | 10/2005 | Goertzen et al. | |
| 2005/0225041 A1 | 10/2005 | Longino | |
| 2006/0021806 A1 | 2/2006 | Goertzen et al. | |
| 2006/0076747 A1 | 4/2006 | Pauls et al. | |
| 2006/0076748 A1 | 4/2006 | Pauls et al. | |
| 2006/0082117 A1 | 4/2006 | Turturiellox | |
| 2006/0086554 A1 | 4/2006 | Jackson et al. | |
| 2006/0201723 A1 | 9/2006 | Hsu et al. | |
| 2006/0213705 A1 | 9/2006 | Molnar | |
| 2006/0244249 A1 | 11/2006 | Goertzen et al. | |
| 2006/0249317 A1 | 11/2006 | Fought | |
| 2006/0255581 A1 | 11/2006 | Goertzen et al. | |
| 2006/0266565 A1 | 11/2006 | Fontecchio et al. | |
| 2007/0018418 A1 | 1/2007 | Huang | |
| 2007/0023209 A1 | 2/2007 | Wu | |
| 2007/0039766 A1 | 2/2007 | Jackson et al. | |
| 2007/0080003 A1 | 4/2007 | Koerlin et al. | |
| 2007/0095582 A1 | 5/2007 | Stuijt et al. | |
| 2007/0107955 A1 | 5/2007 | Puskar-Pasewicz et al. | |
| 2007/0181353 A1 | 8/2007 | Puskar-Pasewicz et al. | |
| 2007/0209848 A1 | 9/2007 | Tang | |
| 2008/0053720 A1 | 3/2008 | Chen et al. | |
| 2008/0087481 A1 | 4/2008 | Grymko et al. | |
| 2008/0157513 A1 | 7/2008 | Cheng | |
| 2008/0208394 A1 | 8/2008 | Fought | |
| 2009/0091092 A1 | 4/2009 | Molnar | |
| 2009/0121532 A1 | 5/2009 | Kruse et al. | |
| 2009/0145677 A1 | 6/2009 | Zhou | |
| 2009/0295119 A1 | 12/2009 | Bloswich | |
| 2010/0004820 A1 | 1/2010 | Bekoscke et al. | |
| 2010/0013172 A1 | 1/2010 | Goertzen | |
| 2010/0065346 A1 | 3/2010 | Porcheron | |
| 2010/0084209 A1 | 4/2010 | Bekoscke et al. | |
| 2010/0102529 A1 | 4/2010 | Lindenkamp et al. | |
| 2010/0301576 A1 * | 12/2010 | Dugas et al. | A61G 5/043 280/104 |
| 2011/0083913 A1 | 4/2011 | Cuson et al. | |
| 2011/0215540 A1 | 9/2011 | Hunziker | |
| 2012/0217070 A1 | 8/2012 | Goertzen | |
| 2012/0217713 A1 | 8/2012 | Molnar | |
| 2012/0299262 A1 | 11/2012 | Bekoscke | |
| 2013/0207364 A1 | 8/2013 | Bekoscke et al. | |

FOREIGN PATENT DOCUMENTS

| | | |
|---|---|---|
| DE | 2256934 | 5/1973 |
| DE | 1399822 | 8/1977 |
| DE | 19806500 | 3/2002 |
| DE | 10136368 | 5/2003 |
| DE | 10136369 | 5/2003 |
| EP | 18101 | 10/1980 |
| EP | 127929 | 12/1984 |
| EP | 268960 | 6/1988 |
| EP | 312969 | 4/1989 |
| EP | 339500 | 11/1989 |
| EP | 369791 | 5/1990 |
| EP | 419085 | 3/1991 |
| EP | 445171 | 9/1991 |
| EP | 511113 | 10/1992 |
| EP | 677285 | 10/1995 |
| EP | 702945 | 3/1996 |
| EP | 829247 | 3/1998 |
| EP | 841052 | 5/1998 |
| EP | 908165 | 4/1999 |
| EP | 908166 | 4/1999 |
| EP | 927551 | 7/1999 |
| EP | 988848 | 3/2000 |
| EP | 1147969 | 10/2001 |
| EP | 1279391 | 1/2003 |
| EP | 1279392 | 1/2003 |
| EP | 1434345 | 7/2004 |
| EP | 1479362 | 11/2004 |
| EP | 1513479 | 3/2005 |
| EP | 1522292 | 4/2005 |
| EP | 1522295 | 4/2005 |
| EP | 1582189 | 10/2005 |
| EP | 2226048 | 9/2010 |
| EP | 2111204 | 4/2011 |
| FR | 27505 | 7/1924 |
| FR | 2215054 | 8/1974 |
| FR | 2399822 | 3/1979 |
| FR | 2455886 | 12/1980 |
| FR | 2498925 | 8/1982 |
| FR | 2738147 | 7/1997 |
| FR | 2749502 | 12/1997 |
| FR | 2858764 | 2/2005 |
| GB | 151915 | 10/1920 |
| GB | 154369 | 12/1920 |
| GB | 265885 | 2/1927 |
| GB | 474349 | 10/1937 |
| GB | 841175 | 7/1960 |
| GB | 1503910 | 3/1978 |
| GB | 2040237 | 8/1980 |
| GB | 2061197 | 5/1981 |
| GB | 2141980 | 1/1985 |
| GB | 2224980 | 5/1990 |
| JP | 57-186589 | 11/1982 |
| JP | 03-011978 | 12/1989 |
| JP | 04-158864 | 6/1992 |
| JP | 07-328073 | 12/1995 |
| JP | 08-038552 | 2/1996 |
| JP | 410248877 | 9/1998 |
| JP | 11059506 | 3/1999 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 4/2001 |
| JP | 2001 258948 | 9/2001 |
| JP | 2001 327545 | 11/2001 |
| JP | 2002 143223 | 5/2002 |
| JP | 2002 165841 | 6/2002 |
| JP | 2004 202264 | 7/2004 |
| SE | 431393 | 11/1983 |
| WO | 82/00445 | 2/1982 |

(56) References Cited

FOREIGN PATENT DOCUMENTS

| | | |
|---|---|---|
| WO | 84/04451 | 11/1984 |
| WO | 87/06205 | 4/1987 |
| WO | 89/06117 | 7/1989 |
| WO | 90/05515 | 5/1990 |
| WO | 90/06097 | 6/1990 |
| WO | 92/09463 | 6/1990 |
| WO | 93/24342 | 12/1993 |
| WO | 94/13241 | 6/1994 |
| WO | 94/15567 | 7/1994 |
| WO | 96/15752 | 5/1996 |
| WO | 97/44206 | 11/1997 |
| WO | 98/46184 | 10/1998 |
| WO | 99/17700 | 4/1999 |
| WO | 00/08910 | 2/2000 |
| WO | 00/09356 | 2/2000 |
| WO | 00/12040 | 3/2000 |
| WO | 00/54718 | 9/2000 |
| WO | 00/66060 | 11/2000 |
| WO | 01/01914 | 1/2001 |
| WO | 02/34190 | 5/2002 |
| WO | 03/030800 | 4/2003 |
| WO | 03/034969 | 5/2003 |
| WO | 03/049664 | 6/2003 |
| WO | 03/101364 | 12/2003 |
| WO | 2004/16451 | 2/2004 |
| WO | 2004/037569 | 5/2004 |
| WO | 2007/11668 | 1/2007 |
| WO | 2007/79346 | 7/2007 |
| WO | 2008/124953 | 3/2008 |
| WO | 2008/084462 | 7/2008 |
| WO | 2008/097879 | 8/2008 |
| WO | 2008/100759 | 8/2008 |

OTHER PUBLICATIONS

Office Action from U.S. Appl. No. 12/522,837 dated Feb. 15, 2011.
Amendment from U.S. Appl. No. 12/522,837 dated Jun. 15, 2011.
Notice of Allowance from U.S. Appl. No. 12/522,837 dated Jul. 26, 2011.
Notice of Allowance from U.S. Appl. No. 12/522,837 dated Jun. 28, 2012.
Office Action from U.S. Appl. No. 12/523,630 dated Dec. 21, 2011.
Response from U.S. Appl. No. 12/523,630 dated Mar. 15, 2012.
Notice of Allowance from U.S. Appl. No. 12/523,630 dated Jun. 11, 2012.
Restriction /Election Requirement for U.S. Appl. No. 12/524,476 dated Dec. 31, 2012.
Office Action from U.S. Appl. No. 12/524,476 dated May 22, 2013.
Amendment in U.S. Appl. No. 12/524,476 dated Nov. 20, 2013.
Final Office Action in U.S. Appl. No. 12/524,476 dated Feb. 27, 2014.
Notice of Allowance from U.S. Appl. No. 12/524,476 dated Aug. 15, 2014.
Office Action from U.S. Appl. No. 12/568,728 dated Jun. 10, 2010.
Response from U.S. Appl. No. 12/568,728 dated Nov. 5, 2010.
Notice of Allowance from U.S. Appl. No. 12/568,728 dated Oct. 26, 2011.
Examiner-Initiated Interview Summary from U.S. Appl. No. 12/568,728 dated Dec. 8, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office Action from U.S. Appl. No. 13/413,839 dated Sep. 26, 2013.
Response to Office Action from U.S. Appl. No. 13/413,839 dated Feb. 26, 2014.
Notice of Allowance from U.S. Appl. No. 13/413,839 dated May 1, 2014.
Restriction Requirement in U.S. Appl. No. 13/465,404 dated Jan. 3, 2013.
Response to Restriction Requirement in U.S. Appl. No. 13/465,404 dated Feb. 4, 2013.
Office Action in U.S. Appl. No. 13/465,404 dated Apr. 11, 2013.
Response to Office Action in U.S. Appl. No. 13/465,404 dated Jul. 11, 2013.
Notice of Allowance in U.S. Appl. No. 13/465,404 dated Sep. 27, 2013.
Office Action from U.S. Appl. No. 13/465,268 dated Jul. 19, 2012.
Response to Office Action from U.S. Appl. No. 13/465,268 dated Jan. 22, 2013.
Final Office Action in U.S. Appl. No. 13/465,268 dated Apr. 15, 2013.
Amendment with RCE, terminal disclaimer for U.S. Appl. No. 13,465,268 dated Oct. 15, 2013.
Non-Final Office Action in U.S. Appl. No. 13/465,268 dated Apr. 15, 2014.
Notice of Allowance for U.S. Appl. No. 13/465,268 dated Oct. 24, 2014.
First Office Action in U.S. Appl. No. 13/566,473 dated Dec. 6, 2012.
Response in U.S. Appl. No. 13/566,473 dated Apr. 8, 2013.
Office Action in U.S. Appl. No. 13/568,623 dated Feb. 1, 2013.
Response to Office Action in U.S. Appl. No. 13/568,623 dated Jun. 19, 2013.
Notice of Allowance in U.S. Appl. No. 13/568,623 dated Oct. 9, 2013.
Notice of Allowance in U.S. Appl. No. 13/568,623 dated Apr. 2, 2014.
Restriction Requirement in U.S. Appl. No. 12/900,548 dated Jun. 28, 2013.
Response to Restriction Requirement in U.S. Appl. No. 12/900,548 dated Jul. 29, 2013.
Office Action in U.S. Appl. No. 12/900,548 dated Sep. 9, 2013.
Response to Office Action in U.S. Appl. No. 12/900,548 dated Jan. 28, 2014.
Office Action in U.S. Appl. No. 12/900,548 dated Jun. 2, 2014.
RCE and Amendment Filed in U.S. Appl. No. 12/900,548 dated Oct. 1, 2014.
Notice of Allowance in U.S. Appl. No. 12/900,548 dated Dec. 18, 2014.
Restriction Requirement from U.S. Appl. No. 13/768,878 dated Jun. 4, 2014.
Response to Restriction Requirement U.S. Appl. No. 13/768,878 dated Sep. 4, 2014.
Office Action from U.S. Appl. No. 13/768,878 mailed Dec. 3, 2014.
Response Office Action from U.S. Appl. No. 13/768,878 mailed Jan. 21, 2015.
"All-Terrain Wheelchair, Designer's Corner", Design News, Feb. 24, 1992, cover page and p. 54.
"Big Bounder Power Wheelchair: Conventional "Tubular" Style Frame"; http://www.wheelchair.com/bigbounderpage.htm, Accessed on the World Wide Web on Dec. 17, 2003, p. 1-4.
"Bounder Plus Power Wheelchair: Convention "Tubular" Style Frame"; http://www.wheelchairs.com/plus.htm, Accessed on the World Wide Web on Dec. 17, 2003, p. 1-4.
"Frog Legs: Smooth Ride Ahead"; http://www.froglegsinc.com/index.php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
Golden Technologies advertisement video http://youtu.be/TyEvrmoaHME.
"Invacare pronto M7I jr. Power Wheelchair Manual"; Accessed on the World Wide Web on Dec. 17, 2003.
"Invacare Storm Series TDX Power Wheelchairs Manual"; Accessed on the World Wide Web on Dec. 17, 2003, p. 1-24.
"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
Kauzlarich, J. et al., "Wheelchair Caster Shimmy II: Damping", Journal for Rehabilitative Research and Development, May/Jun. 2000, vol. 37, No. 3, pp. 305-314.
McLauren, C., "Future Developments—Current Directions in Wheelchair Research", Journal for Rehabilitative Research and Development, Jul./Aug. 1985, vol. 42, No. 4 Suppl. No. 2, pp. 88-99.

(56) References Cited

OTHER PUBLICATIONS

"Bruno Independent Living Aids ISP 9001 Certified"; http://www.bruno.com/power_chairs.htm, Accessed on the World Wide Web on Dec. 17, 2003, p. 1-5.
"Top End Terminator SS Sports Wheelchair", http://phc-online.com/terminator_ss.htm, Accessed on the World Wide Web on Dec. 17, 2003, p. 1-5.
"Transactions of the Institute of Measurement and Control", The British Library of Science Technology and Business, vol. 24, Nov. 5, 2002, 15 pgs.
M.J. Lawn, et al., "Modeling of a Stair-Climbing Wheelchair Mechanism with High Single-Step Capability", IEEE Transactions on Neutral Systems and Rehabilitation Engineering, vol. 11, No. 3, Sep. 2003, pp. 323-332.
Quickie G-424 User Instruction Manual & Warranty, 930484 Rev. A (27 sheets).
10 photographs (8.5×11) of Quickie G-424 Wheelchair obtained Nov. 24, 2004.
Sunrise Medical, Inc., Power Products Parts Manual, 930307 Rev. K (264 double sided sheets), Jul. 2004. (Note: various dates are alleged therein based on wheelchair products listed including the Quickie G-424.
Permobil Chairman HD3 Owner's Manual ated May 2003, 52 pages.
Permobil C400 Power Wheelchair, Owner's Manual, version 6, 2010, Permobil AB, Sweden; 100 pgs.
Perrnobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
"Bike" magazine article, "Ten Underrated Products You Probably Don't Own but Maybe Should" (in part), Jan. 1994, pp. 82 and 83..
"Bike" magazine article "Softride Contour", Mar. 1994, pp. 64-65.
"Mountain Bike Action", picture and caption describing "Body Shock", Jan. 1994, pp. 48.
International Search Report from PCT/US98/07543 dated Aug. 19, 1998.
International Search Report from PCT/US01/42656 dated Jan. 14, 2003.
International Search Report from PCT/US02/29996 dated Jun. 24, 2003.
International Preliminary Examination Report from PCT/US02/29996 dated Dec. 11, 2003.
International Search Report from PCT/US02/29998 dated Dec. 12, 2002.
International Preliminary Examination Report from PCT/US02/29998 dated Jan. 13, 2004.
International Search Report and Written Opinion from PCT/US03/25736 dated Dec. 28, 2004.
International Search Report from PCT/US03/34124 dated Dec. 28, 2004.
International Preliminary Examination Report from PCT/US03/34124 dated Aug. 25, 2006.
International Search Report and Written Opinion from PCT/IB08/050111 dated Jun. 4, 2008.
Amendments under Article 34(2)(b) PCT and Comments from PCT/IB08/050111 dated Oct. 2, 2008.
International Preliminary Report on Patentability for International Patent Application No. PCT/IB08/050111 dated Apr. 22, 2009.
International Search Report from and Written Opinion from PCT/US08/52878 dated Jul. 3, 2008.
International Search Report and Written Opinion from PCT/US08/53242 dated Sep. 3, 2008.
International Search Report and Written Opinion from PCT/US10/51888 dated Dec. 6, 2010.
International Search Report and Written Opinion for PCT/US13/026441 dated Apr. 23, 2013.
Office action mailed Feb. 2, 2006 from Control No. 90/007,491.
Interview Summary from Control No. 90/007,491 dated Mar. 23, 2006.
Statement as to the substance of an Interview from Control No. 90/007,491 Apr. 3, 2006.
Response from Control No. 90/007,491 dated Apr. 3, 2006.
Office action mailed Jul. 5, 2006 from Control No. 90/007,491.
Response to Office action from Control No. 90/007,491 dated Sep. 11, 2006.
Office action mailed Sep. 21, 2006 from Control No. 90/007,491.
Response from Control No. 90/007,491 dated Nov. 9, 2006.
Notice of Appeal from Control No. 90/007,491 dated Nov. 9, 2006.
Advisory action from Control No. 90/007,491 dated Nov. 22, 2006.
Appeal Brief from Control No. 90/007,491 dated Jan. 16, 2007.
Advisory action from Control No. 90/007,491 dated Apr. 20, 2007.
Examiner's Answer from Control No. 90/007,491 dated Sep. 24, 2007.
Reply Brief from Control No. 90/007,491 dated Nov. 21, 2007.
Supplemental Examiner's Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment for U.S. Appl. No. 09/698,481 dated Mar. 27, 2002.
Complaint for Patent Infringement Demand for Jury Trial, Case No. 1:06CV0517.
Request for Reexamination of U.S. Pat. No. 6,196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office action from U.S. Appl. No. 08/228,584 dated Apr. 14, 1995.
Response from U.S. Appl. No. 08/228,584 dated Jul. 6, 1995.
Office action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office action from U.S. Appl. No. 08/228,584 dated Mar. 29, 1996.
Response from U.S. Appl. No. 08/228,584 dated Jun. 3, 1996.
Notice of allowance from U.S. Appl. No. 08/228,584 dated Jun. 24, 1996.
Office action from U.S. Appl. No. 08/694,484 dated Dec. 2, 1996.
Response from U.S. Appl. No. 08/694,484 dated Apr. 2, 1997.
Office action from U.S. Appl. No. 08/694,484 dated Jul. 7, 1997.
Office action from U.S. Appl. No. 08/694,484 dated Dec. 3, 1997.
Office action from U.S. Appl. No. 08/694,484 dated Feb. 10, 1998.
Response from U.S. Appl. No. 08/694,484 dated May 4, 1998.
Notice of Allowance from U.S. Appl. No. 08/694,484 dated Jul. 31, 1998.
Office action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office action from U.S. Appl. No. 09/607,468 dated Sep. 26, 2001.
Response from U.S. Appl. No. 09/607,468 dated Dec. 21, 2001.
Office action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.

(56) References Cited

OTHER PUBLICATIONS

U.S. Patent Office action dated Nov. 27, 2001 from U.S. Appl. No. 09/698,481.
Office Action from U.S. Appl. No. 10/762,977 dated Oct. 25, 2005.
Notice of Allowance from U.S. Appl. No. 10/762,977 dated Feb. 23, 2006.
Notice of Allowance from U.S. Appl. No. 11/077,483 dated Aug. 9, 2007.
Office Action mailed Mar. 28, 2006 from U.S. Appl. No. 11/145,477.
Office Action dated Sep. 8, 2006 from U.S. Appl. No. 11/145,477.
Response from U.S. Appl. No. 11/145,477 dated Dec. 12, 2006.
Notice of Allowance from U.S. Appl. No. 11/145,477 dated Jan. 8, 2007.
U.S. Patent Office Action dated Jul. 25, 2006 from U.S. Appl. No. 11/209,001.
Office Action dated Nov. 8, 2006 from U.S. Appl. No. 11/209,001.
Notice of Abandonment from U.S. Appl. No. 11/209,001 dated Jul. 10, 2007.
Office Action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office Action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office Action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office Action from U.S. Appl. No. 11/472,509 dated May 15, 2009.
Response from U.S. Appl. No. 11/472,509 dated Nov. 15, 2009.
Office Action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509 filed Mar. 2, 2011.
Interview Summary from U.S. Appl. No. 11/472,509 filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Notice of Allowance from U.S. Appl. No. 11/472,509 dated Nov. 14, 2011.
Supplemental amendment identifying cross-references to related applications from U.S. Appl. No. 11/472,509 dated Aug. 7, 2012.
Notice of Allowance from U.S. Appl. No. 11/472,509 dated Oct. 19, 2012.
Office Action dated Mar. 21, 2007 from U.S. Appl. No. 11/474,834.
Response from U.S. Appl. No. 11/474,834 dated Jun. 28, 2007.
Office Action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
Office Action dated Nov. 8, 2006 from U.S. Appl. No. 11/490,899.
Office Action dated Jan. 9, 2007 from U.S. Appl. No. 11/490,899.
Response from U.S. Appl. No. 11/490,899 dated Mar. 20, 2007.
Notice of Allowance dated Jun. 6, 2007 from U.S. Appl. No. 11/490,899.
Notice of Allowance from U.S. Appl. No. 11/490,899 dated Feb. 10, 2009.
Office Action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.
Notice of Allowance from U.S. Appl. No. 12/118,099 dated Jul. 3, 2013.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Notice of Allowance from U.S. Appl. No. 12/330,554 dated Nov. 15, 2011.
Response from U.S. Appl. No. 09/698,481 dated Mar. 27, 2002.
U.S. Patent Office Action dated Jun. 27, 2002 from U.S. Appl. No. 09/698,481.
Response from U.S. Appl. No. 09/698,481 dated Oct. 29, 2002.
U.S. Patent Office Advisory action dated Nov. 13, 2002 from U.S. Appl. No. 09/698,481.
Supplemental Amendment after Final dated Nov. 27, 2002 from U.S. Appl. No. 09/698,481.
Notice of Allowance dated Dec. 12, 2002 from U.S. Appl. No. 09/698,481.
Office Action from U.S. Appl. No. 09/712,547 dated May 23, 2001.
Response from U.S. Appl. No. 09/712,547 dated Aug. 23, 2001.
Office Action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office Action from U.S. Appl. No. 09/974,348 dated Feb. 27, 2003.
Response from U.S. Appl. No. 09/974,348 dated Jul. 28, 2003.
Office Action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office Action from related U.S. Appl. No. 10/044,826, mailed Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office Action dated Aug. 8, 2003 from U.S. Appl. No. 10/390,133.
Response from U.S. Appl. No. 10/390,133 dated Feb. 11, 2004.
U.S. Patent Office Action dated Jun. 16, 2004 from U.S. Appl. No. 10/390,133.
Response from U.S. Appl. No. 10/390,133 dated Dec. 20, 2004.
Supplemental Notice of Allowance dated Mar. 30, 2005 from U.S. Appl. No. 10/390,133.
Notice of Allowance dated Jan. 11, 2005 from U.S. Appl. No. 10/390,133.
U.S. Patent Office Action dated Aug. 8, 2003 from U.S. Appl. No. 10/390,386.
Response from U.S. Appl. No. 10/390,386 dated Nov. 11, 2003.
U.S. Patent Office Action dated Jan. 28, 2004 from U.S. Appl. No. 10/390,386.
Response from U.S. Appl. No. 10/390,386 dated May 28, 2004.
U.S. Patent Office Action dated Oct. 12, 2004 from U.S. Appl. No. 10/390,386.
Response from U.S. Appl. No. 10/390,386 dated Mar. 16, 2005.
Notice of Allowance dated Apr. 7, 2005 from U.S. Appl. No. 10/390,386.
Notice of Allowance from U.S. Appl. No. 10/643,010 dated Sep. 30, 2004.
Office Action from U.S. Appl. No. 10/695,045 dated Feb. 22, 2005.
Response from U.S. Appl. No. 10/695,045 dated Jul. 25, 2005.
Office Action from U.S. Appl. No. 10/695,045 dated Oct. 20, 2005.

(56) References Cited

OTHER PUBLICATIONS

Response from U.S. Appl. No. 10/695,045 dated Jan. 17, 2006.
Notice of Allowance from U.S. Appl. No. 10/695,045 dated Apr. 11, 2006.
Office Action from U.S. Appl. No. 10/762,977 dated Jan. 18, 2005.
Response from U.S. Appl. No. 10/762,977 dated May 18, 2005.
Office Action from U.S. Appl. No. 10/762,977 dated Aug. 11, 2005.
Response from U.S. Appl. No. 10/762,977 dated Oct. 3, 2005.
Amended Appeal Brief from Control No. 90/007,491 dated Jun. 29, 2007.
Notice of Allowance from U.S. Appl. No. 11/490,899 dated May 26, 2009.
Office Action from U.S. Appl. No. 12/568,728 dated Jan. 24, 2011.
Notice of Allowance for U.S. Appl. No. 13/768,878 dated Dec. 11, 2015.
Notice of Allowance from U.S. Appl. No. 14/162,955 mailed May 26, 2015.
Restriction Requirement from U.S. Appl. No. 14/486,766 dated Jun. 8, 2015.
Response to Restriction Requirement from U.S. Appl. No. 14/486,766 dated Aug. 10, 2015.
Office Action from U.S. Appl. No. 14/486,766 dated Sep. 16, 2015.
Response to Office Action from U.S. Appl. No. 14/486,766 dated Dec. 8, 2015.
Office Action from U.S. Appl. No. 14/566,899 dated Sep. 17, 2015.
Response to Office Action from U.S. Appl. No. 14/566,899 dated Dec. 10, 2015.
Office Action from U.S. Appl. No. 14/690,678 dated Nov. 16, 2015.
Office Action from U.S. Appl. No. 14/446,735 mailed Jan. 14, 2016.
Notice of Allowance from U.S. Appl. No. 14/486,766 dated Feb. 9, 2016.
Notice of Allowance from U.S. Appl. No. 14/566,899 dated Jan. 21, 2016.

* cited by examiner

WHEELCHAIR SUSPENSION

CROSS-REFERENCE TO RELATED APPLICATIONS

This application is a continuation of U.S. application Ser. No. 13/465,268, filed May 7, 2012 titled, "Wheelchair Suspension", which is a continuation of U.S. patent application Ser. No. 12/330,554, filed Dec. 9, 2008, now U.S. Pat. No. 8,172,015, issued May 8, 2012, titled "Wheelchair Suspension", which is a continuation of U.S. patent application Ser. No. 11/429,687, filed May 8, 2006, now U.S. Pat. No. 7,472,767, issued Jan. 6, 2009, which is a continuation of U.S. patent application Ser. No. 10/762,977, filed Jan. 22, 2004, now U.S. Pat. No. 7,055,634, issued Jun. 6, 2006, which is a continuation of U.S. patent application Ser. No. 09/974,348, filed Oct. 10, 2001, now U.S. Pat. No. 7,040,429, issued May 9, 2006, the disclosures of which are fully incorporated by reference herein in their entirety.

FIELD OF THE INVENTION

The invention relates generally to conveyances and, more particularly, to wheelchair suspensions.

BACKGROUND OF THE INVENTION

Wheelchairs are an important means of transportation for a significant portion of society. Whether manual or powered, wheelchairs provide an important degree of independence for those they assist. However, this degree of independence can be limited if the wheelchair is required to traverse obstacles such as, for example, curbs that are commonly present at sidewalks, driveways, and other paved surface interfaces.

In this regard, most wheelchairs have front and rear casters to stabilize the chair from tipping forward or backward and to ensure that the drive wheels are always in contact with the ground. One such wheelchair is disclosed in U.S. Pat. No. 5,435,404 to Garin. On such wheelchairs, the caster wheels are typically much smaller than the driving wheels and located both forward and rear of the drive wheels. Though this configuration provided the wheelchair with greater stability, it made it difficult for such wheelchairs to climb over obstacles such as, for example, curbs or the like, because the front casters could not be driven over the obstacle due to their small size and constant contact with the ground.

U.S. Pat. No. 5,964,473 to Degonda et al. describes a wheelchair having front and rear casters similar to Garin and a pair of additional forward lift wheels. The lift wheels are positioned off the ground and slightly forward of the front caster. Configured as such, the lift wheels first engage a curb and cause the wheelchair to tip backwards. As the wheelchair tips backwards, the front caster raises off the ground to a height so that it either clears the curb or can be driven over the curb.

U.S. Pat. No. 6,196,343 to Strautnieks also describes a wheelchair having front and rear casters. The front casters are each connected to a pivot arm that is pivotally attached to the sides of the wheelchair frame. Springs bias each pivot arm to limit the vertical movement thereof. So constructed, each front caster can undergo vertical movement when running over an obstacle.

SUMMARY OF THE INVENTION

The present invention relates to a wheelchair suspension that includes a frame, a pivoting assembly, at least one front caster, and at least one rear caster. The pivoting assembly has a first link pivotally coupled to the frame member, a second link pivotally coupled to the frame member, a drive assembly fixedly connected to a first end of the first link, and a third link pivotally connected to the first link and pivotally connected to the second link. The drive assembly causes downward pivotal movement of the first end of the first link and upward pivotal movement of a second end of the first link. The upward pivotal movement of the second end of the first link causes the second link and the caster assembly to undergo upward movement.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The present invention provides a wheelchair and suspension for traversing obstacles and rough terrain. The present invention facilitates the traversing of obstacles and rough terrain by allowing for the vertical and lateral movement of one or more front caster assemblies coupled to the wheelchair.

Figure 1:
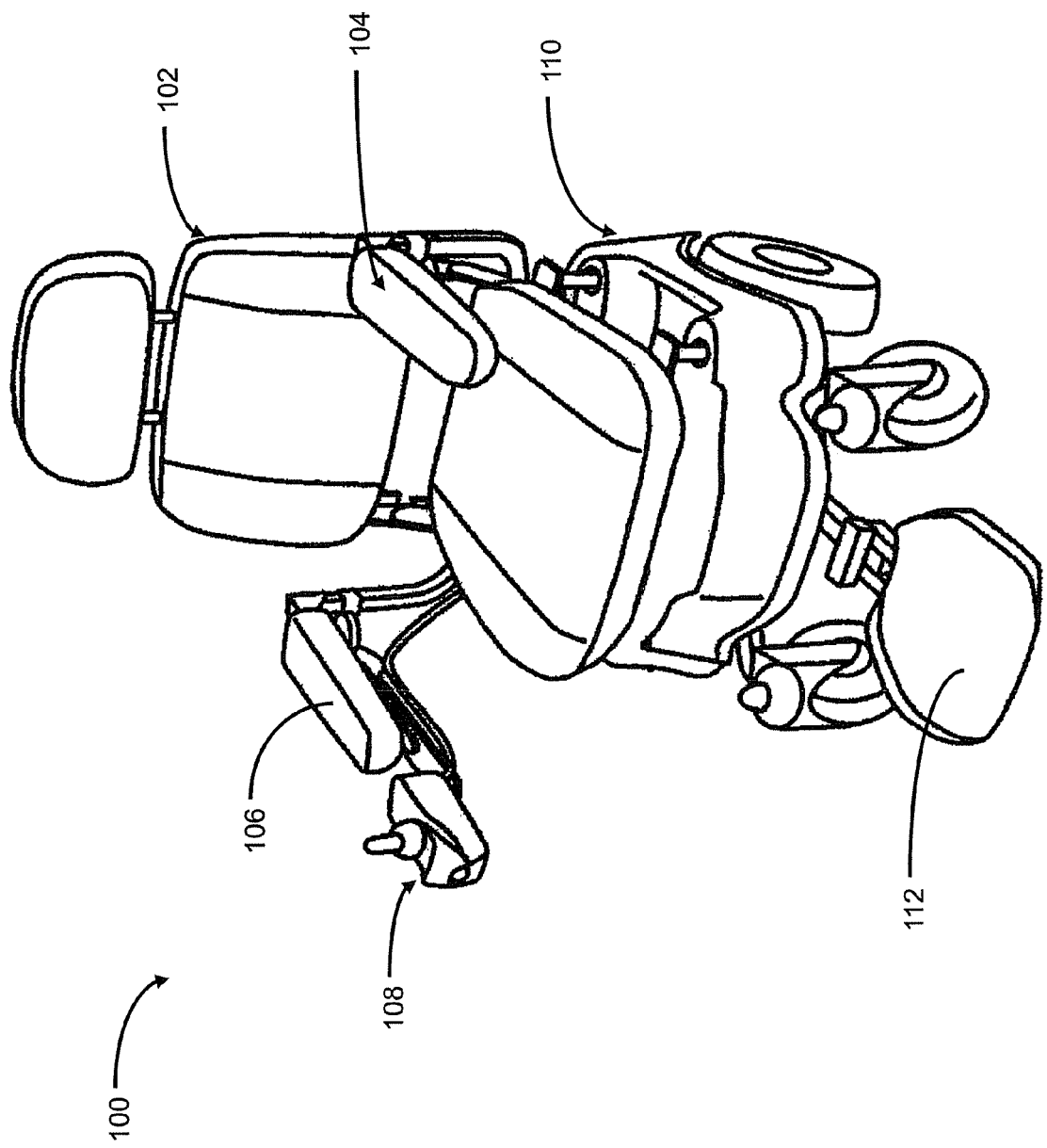
FIG. 1 is a perspective view of a wheelchair incorporating the suspension of the present invention.

Referring now to FIG. 1, a perspective view of a wheelchair 100 of the present invention is shown. Wheelchair 100 is preferably a mid-wheel drive or rear-wheel drive wheelchair. As shown, wheelchair 100 has a chair 102 having arm supports 104 and 106. A control device such as, for example, a joystick controller 108 is attached to the chair 102 for controlling any power-related aspects of wheelchair 100. Wheelchair 100 further has removable decorative shrouds 110 covering the wheelchair's suspension, drive, and control systems. Projecting forward from the shrouds 110 is footrest 112 for supporting the feet of the wheelchair's user.

Figure 2:
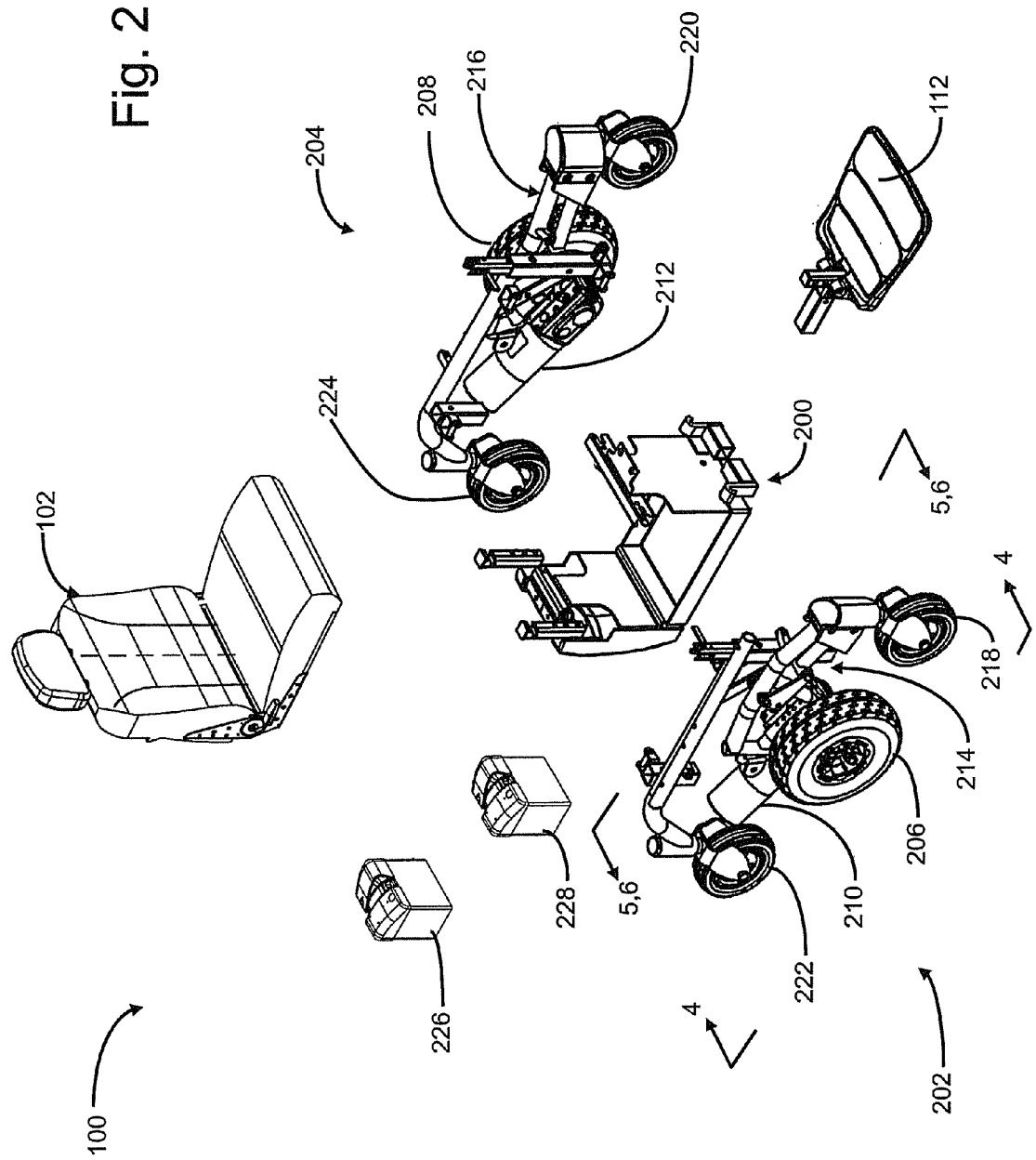
FIG. 2 is an exploded perspective view of certain components of the wheelchair of FIG. 1.

Illustrated in FIG. 2 is an exploded perspective view of certain components of wheelchair 100. The suspension system has a sub-frame 200 for accommodating, among other things, removable batteries 226 and 228. Removably attached to sub-frame 200 are first and second side frame assemblies 202 and 204. Side frame assemblies 202 and 204 are removably attached to sub-frame 202 via interfaces preferably in the form of spring loaded hooks and latches. The spring loaded hooks preferably reside on sub-frame 200 with the corresponding latches residing on side-frame assemblies 202 and 204. In this manner, an individual can manually without the use of tools take apart wheelchair 100 for easy transportation in, for example, the trunk of a car or other large vehicle.

Each side frame assembly has at least one drive assembly having a motor drive 210 and 212 and a drive wheel 206 and 208. Each motor drive 210 and 212 preferably has either a motor/gear box combination or a brushless, gearless motor. Each side frame assembly further has at least one front caster assembly 218 and 220 coupled thereto via pivoting assemblies 214 and 216. At least one rear caster assembly 222 and 224 are also provided for each side frame assembly. Each of the side frame assemblies are identical in construction and, hence, the present discussion will focus on describing side frame assembly 202 with the understanding that such discussion is equally applicable to side frame assembly 204.

Figure 3:
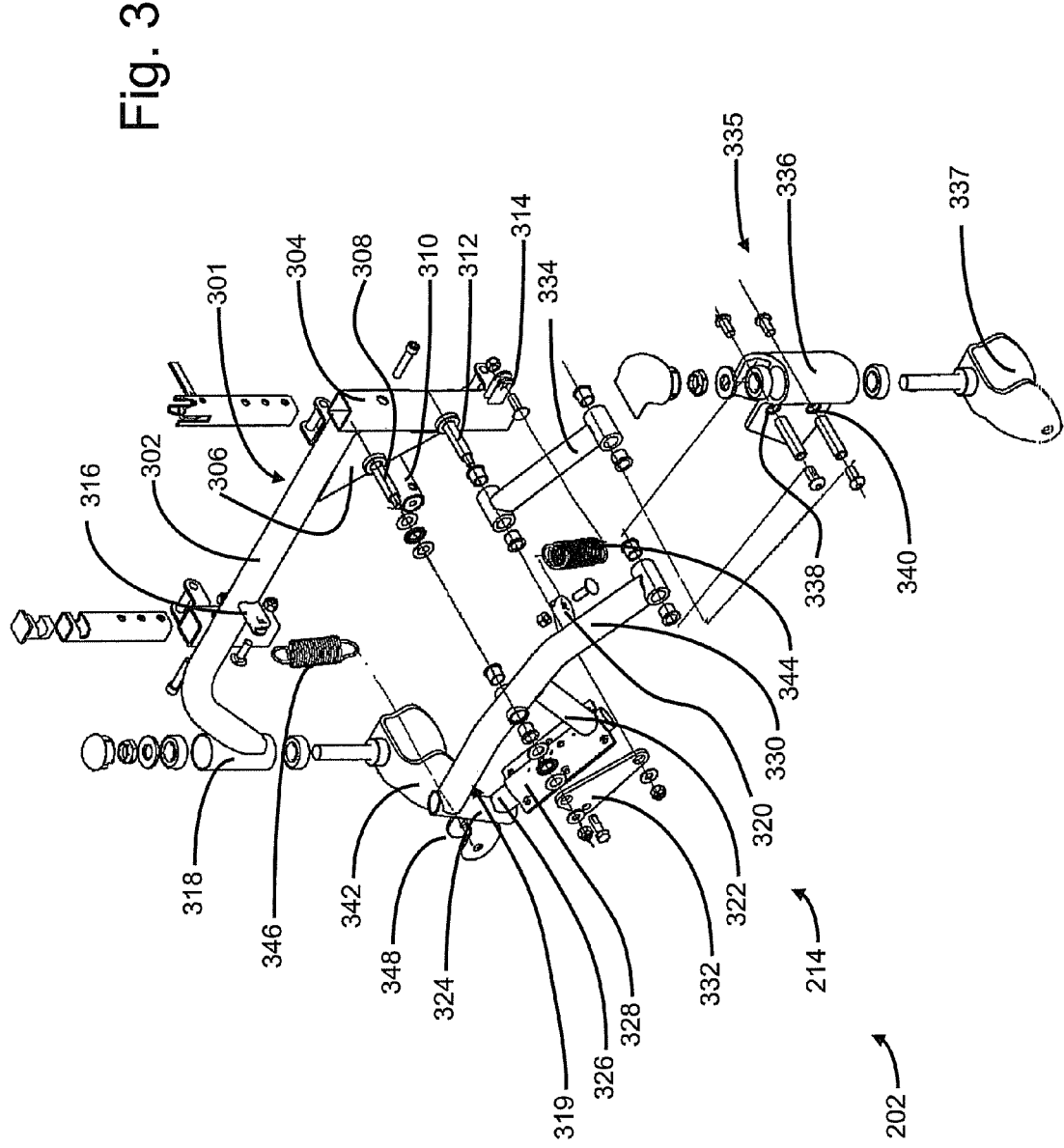
FIG. 3 is an exploded detail view of certain components of a side frame assembly of the present invention.

Referring now to FIG. 3, an exploded detailed perspective of certain components of side frame simply 202 is shown. In this regard, side frame assembly 202 has a side frame member 301 having sub-members 302, 304, 306, and 318. These side frame sub-members are preferably tubular (i.e., circular, oval, or rectangular in cross-section) and formed and welded together has shown. Pivoting assembly 214 has a first pivoting linkage 319 defined by sub-linkages 320, 322, 324, and 326. These sub-linkages are also preferably tubular in configuration, as described above, and formed and welded together as shown. Sub-linkage 326 has a motor drive assembly mounting bracket 328 attached thereto. A second pivoting linkage 334 is also provided. As shown in FIG. 3, the overall length of the first pivoting linkage 319 is greater than the overall length of the second pivoting linkage 334. As will be presently described, this configuration facilitates, for example, the dual functions of lifting and retracting the front caster assembly 335 away from the obstacle to be traversed and inward toward the wheelchair.

The first pivoting linkage 319 is pivotally coupled to side frame member 301 via tubular stud or extension 308. The second pivoting linkage 334 is pivotally coupled to side through member 301 via tubular stud or extension 312. A compression plate 332 is provided for additional stability and is coupled to side frame member 301 via tubular studs or extensions 308 and 312 and pivot stop member 310.

Resilient extension springs 344 and 346 are provided between side frame member 301 and first pivoting linkage 319. In this regard, spring 344 has a first connection to frame member 301 via bracket 314 and a second connection to first pivoting linkage 319 via bracket 330. Spring 346 has a first connection to frame member 301 via bracket 316 and a second connection to first pivoting linkage 319 via bracket 348. As will be described in more detail, extension springs 344 and 346 are connected to first pivoting linkage 319 on either side of the linkages pivotal connection to side frame member 301 and provide a unidirectional bias force around the first pivoting linkage 319 pivotal coupling to side frame member 301. Alternatively, resilient elastomeric members can be integrated into the pivotal coupling between first pivoting linkage 319 and side frame member 301. Similarly, resilient elastomeric members can be integrated into the pivotal coupling between second pivoting linkage 334 and side frame member 301. Such resilient elastomeric members can be "Rosta"-type bearings or other similar structures.

A front caster assembly 335 is pivotally coupled to each of the first and second pivoting linkages 319 and 334. In this regard, front caster assembly 335 has an integral head tube/bracket 336 for receiving a caster fork 337 and making the aforementioned pivotal couplings to linkages 319 and 334. These pivotal couplings to linkages 319 and 334 are facilitated by first and second holes 338 and 340 in head tube/bracket 336 and corresponding tubular formations in first and second pivoting linkages 319 and 334. A rear caster is attached to side frame assembly 301 via rear caster fork 342, which is received in sub-frame member 318.

Configured as such, first and second pivoting linkages 319 and 334 pivot with respect to side frame member 301. Moreover, front caster assembly 335 undergoes spatial displacement with the pivotal movement of first and second pivoting linkages 319 and 334. The rear caster wheel and fork 342 are generally not affected by the pivotal movement of first and second pivoting linkages 319 and 334.

Figure 4:
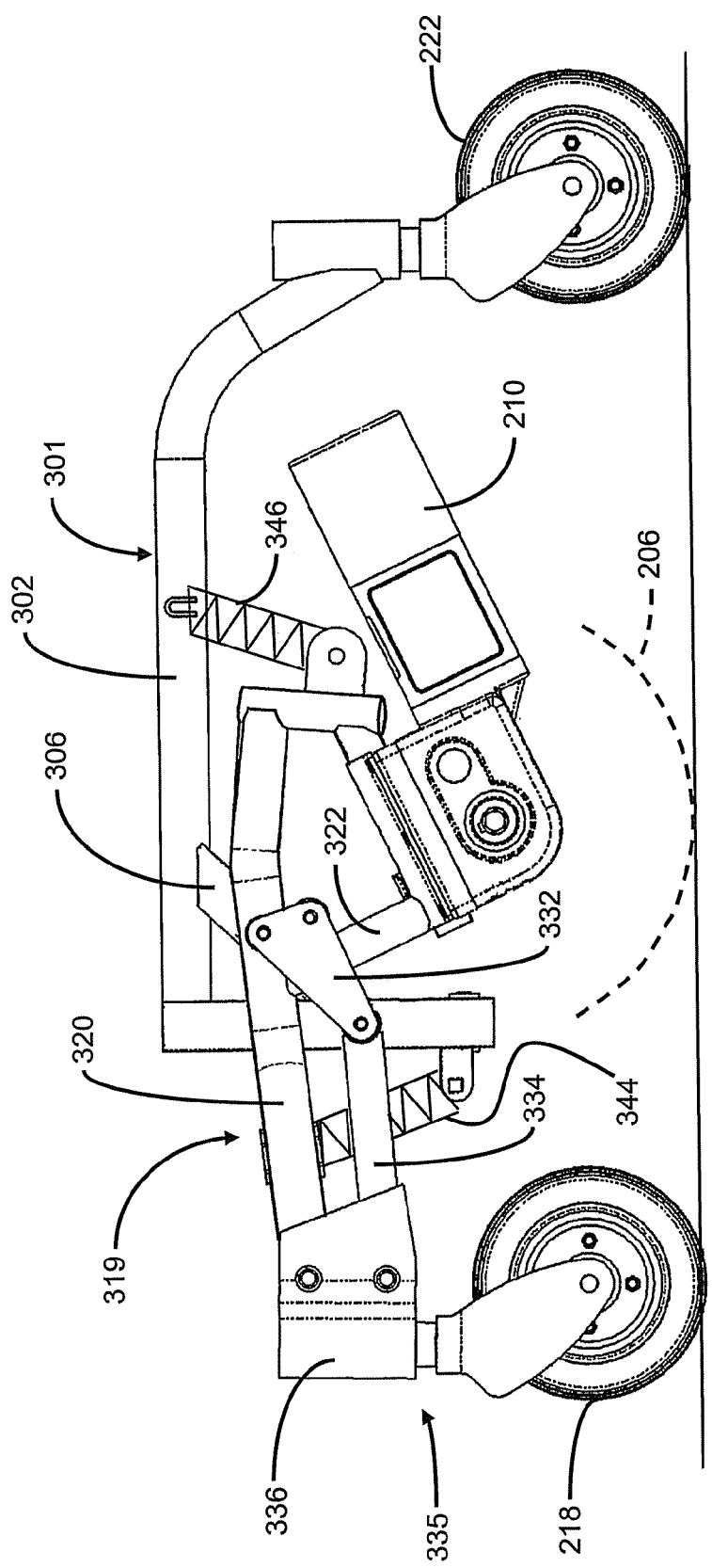
FIG. 4 is a side elevational view of the side frame assembly under static conditions.

Referring now to FIG. 4, an outer side elevational view of side frame assembly 202 is shown under static conditions (i.e., the wheelchair is standing still or neither accelerating or decelerating). Drive wheel 206 is only partially shown so to not obscure the relevant components of side frame assembly 202. In this state, all wheels including the drive wheels and front and rear caster wheels are in contact and maintain contact with the ground or other riding surface.

Figure 5:
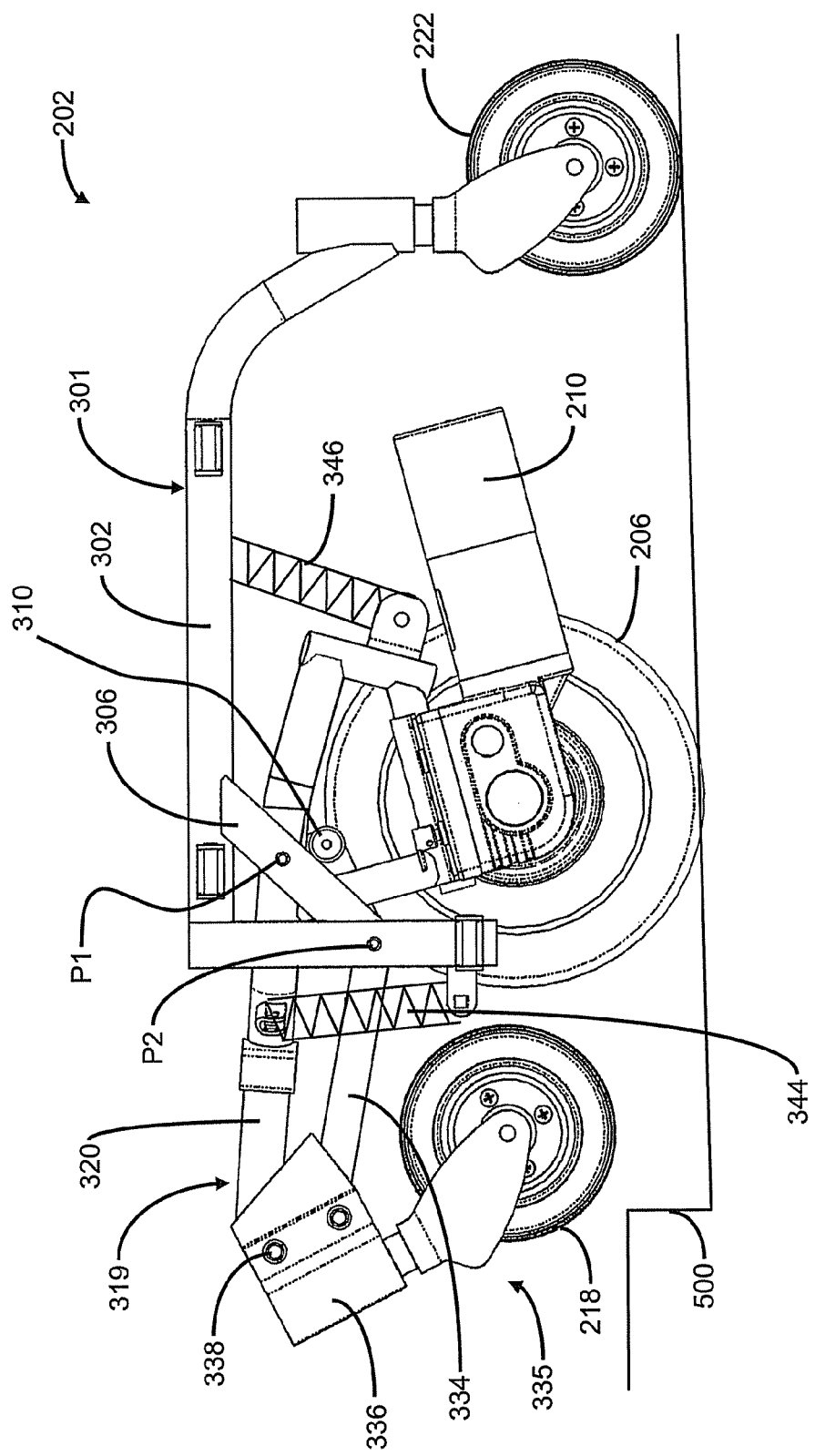
FIG. 5 is a side elevational view of the side frame assembly traversing an obstacle by ascending an obstacle.

Referring now to FIG. 5, an inner side elevational view of side frame assembly 202 is shown as the wheelchair traverses an elevated obstacle. The component displacement shown in FIG. 5 normally occurs when the wheelchair is quickly accelerated forward to traverse an obstacle such as curb 500. For purposes of the present discussion, the pivotal coupling between first pivoting linkage 319 and side frame member 301 is designated by pivot P1. Similarly, the pivotal coupling between the second pivoting linkage 334 and side frame member 301 is designated by pivot P2. In relationship to each other, it can be seen that pivot P2 is below and laterally offset from pivot P1 in a direction toward the front caster. In other words, pivot P2 is laterally closer to front caster assembly 335 than is pivot P1. In combination with the respective overall lengths of first and second pivoting linkages 319 and 334, this configuration provides the dual functions of lifting and retracting the front caster assembly 335 away from the obstacle to be traversed and inward toward the wheelchair.

In this regard, when the wheelchair is accelerated forward by a high rate, the resulting moment arm generated by the drive wheel 206 will exceed the resultant moment arm generated by springs 344 and 346. This causes first pivoting linkage 319 to pivot or rotate in a clockwise direction about pivot P1 thereby raising front caster assembly 335. This motion also causes second pivoting linkage 334 to undergo pivotal motion. The resulting effect of second pivoting linkage 334 motion is to cause front caster assembly 335 to pivot about its pivotal coupling 338 to first pivoting linkage 319. This pivotal movement causes front caster assembly 335 to be drawn inward toward the wheelchair itself and away from the obstacle 500 being traversed. The maximum amount of pivotal movement is limited by stop 310, which physically engages side frame member 301 sub-linkage 320. The same effect described above is achieved should side frame assembly 202 be driven directly over obstacle 500. Once the resultant movement arm generated by drive wheel 206 is less than the resultant movement arm generated by springs 344 and 346 with respect to pivot P1 front caster assembly 335 is lowered.

Figure 6:
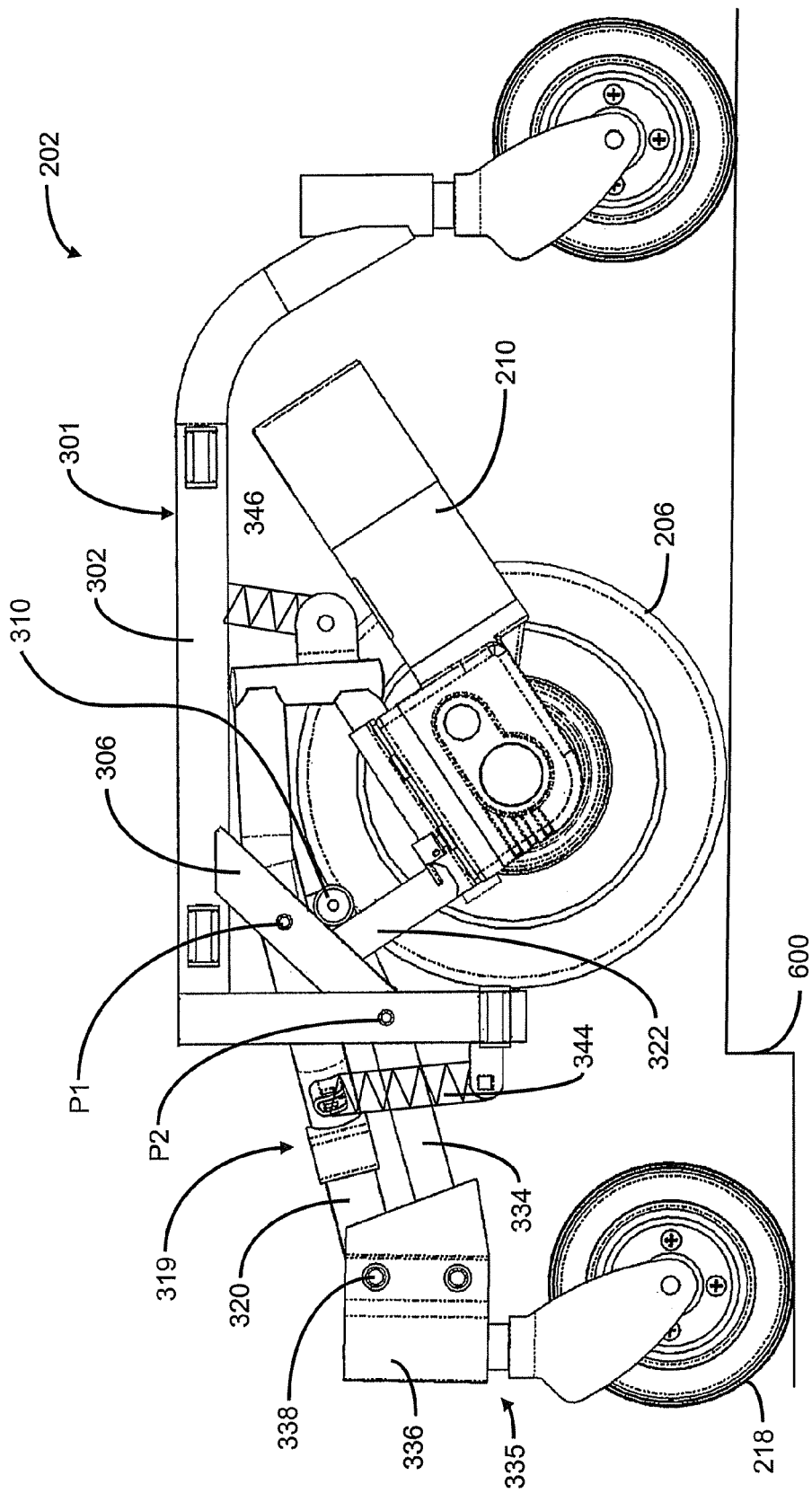
FIG. 6 is a side elevational view of the side frame assembly traversing an obstacle by descending the obstacle.

Referring now to FIG. 6, an inner side elevational view of side frame assembly 202 is shown as the wheelchair traverses descends an obstacle 600. In this regard, the resultant moment arm generated by springs 344 and 346 is greater than any other moment arm around pivot P1. This causes first pivoting linkage 319 to rotate counter-clockwise and to lower the front caster assembly 335 on the lower supporting or riding surface. In this regard, the respective position of pivot P2 and the overall length of second pivoting linkage 334 compared to the position of pivot P1 and the overall length of first pivoting linkage 319 provide for front caster assembly 335 to descend to the lower supporting surface. Concurrently therewith, the pivotal motion of second pivoting linkage 334 causes front caster assembly 335 to pivot about its pivotal coupling 338 to first pivoting linkage 319. This motion causes front caster assembly 335 to extend forward. The combined effect of lowering and extending front caster assembly 335 provide the wheelchair with greater stability when descending a obstacle because the wheelchair is sooner and longer in contact with the differing elevations that represent the obstacle. The maximum pivotal movement is once again limited by stop 310, which physically engages side frame member 301 sub-linkage 322 in this scenario.

Hence, the present invention facilitates the traversing of obstacles and rough terrain by allowing for the vertical and lateral movement of one or more front caster assemblies.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, a plurality of casters can be used instead of one caster, the casters can be coupled to the pivot arms via shock absorbing fork assemblies, and the specific locations of the pivotal couplings can be modified so long as the above-described overall relationships are maintained. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A wheelchair suspension comprising:
    a frame member;
    a pivoting assembly having:
        a first link pivotally coupled directly to the frame member; and
        a second link pivotally coupled directly to the frame member;
        a drive assembly fixedly connected to a first end of the first link;
        a third link pivotally connected to the first link and pivotally connected to the second link;
    at least one rear caster; and
    at least one front caster assembly coupled to the pivoting assembly;
    wherein the drive assembly causes downward pivotal movement of the first end of the first link and upward pivotal movement of a second end of the first link;
    wherein the upward pivotal movement of the second end of the first link causes the second link and the caster assembly to undergo upward movement.

2. The suspension of claim 1 further comprising a stop configured to limit the pivotal movement of the first link.

* * * * *